(12) United States Patent
Baudouin et al.

(10) Patent No.: US 8,009,789 B2
(45) Date of Patent: Aug. 30, 2011

(54) STORAGE DEVICE FOR STORING AND TRANSPORTING NUCLEAR FUEL ASSEMBLIES

(75) Inventors: Joël Baudouin, Savigny sur Orge (FR); Damien Sicard, Paris (FR); Camille Otton, Elancourt (FR)

(73) Assignee: Cogema Logistics, Montigny le Bretonneux (FR)

( * ) Notice: Subject to any disclaimer, the term of this patent is extended or adjusted under 35 U.S.C. 154(b) by 67 days.

(21) Appl. No.: 11/631,757

(22) PCT Filed: Jul. 7, 2005

(86) PCT No.: PCT/FR2005/050552
§ 371 (c)(1),
(2), (4) Date: Jan. 22, 2008

(87) PCT Pub. No.: WO2006/005891
PCT Pub. Date: Jan. 19, 2006

(65) Prior Publication Data
US 2008/0253495 A1 Oct. 16, 2008

(30) Foreign Application Priority Data
Jul. 8, 2004 (FR) ...................... 04 07625

(51) Int. Cl.
*G21C 19/00* (2006.01)
*G21F 5/00* (2006.01)
(52) U.S. Cl. .................. 376/272; 250/506.1; 250/507.1
(58) Field of Classification Search ............... 250/506.1, 250/507.1; 376/272
See application file for complete search history.

(56) References Cited

U.S. PATENT DOCUMENTS

| 5,881,120 A * | 3/1999 | Chanzy et al. ................ 376/272 |
| 5,926,516 A | 7/1999 | Rudnick et al. ............... 376/272 |
| 6,674,827 B2 * | 1/2004 | de la Pena et al. ............ 376/272 |
| 2002/0118786 A1 * | 8/2002 | Ohsono et al. ................ 376/272 |

FOREIGN PATENT DOCUMENTS

| EP | 1260990 | 11/2002 |
| FR | 2433226 A | 3/1980 |
| FR | 2650113 A2 * | 1/1991 |

(Continued)

OTHER PUBLICATIONS

"Improving Spent Fuel Racks with an Aluminum-Based Neutron Absorber", NuclearEngineering International, Wilminton Publishing Ltd, GB, vol. 34, No. 422, Sep. 1, 1989 (pp. 34-35), ISSN: 0029-5507. (AAR Brooks & Perkins Corporation, Advanced Standards Division, Nuclear Products Group).*

(Continued)

*Primary Examiner* — Rick Palabrica
*Assistant Examiner* — Erin M B Leach
(74) *Attorney, Agent, or Firm* — Nixon Peabody LLP

(57) ABSTRACT

The invention relates to a storage device (1) for storing and transporting nuclear fuel assemblies, the device comprising a plurality of adjacent compartments, each having a lateral wall and being capable of receiving a nuclear fuel assembly, the lateral walls being made using notched structural units (6a, 6b) that are stacked and crisscrossed. According to the invention, each unit (6a, 6b) comprises two spaced-apart flats (16, 18) made of a neutrophage material, as well as an intermediate structure (119) situated between the flats (16, 18) and in contact with them.

13 Claims, 6 Drawing Sheets

FOREIGN PATENT DOCUMENTS

| | | |
|---|---|---|
| JP | 2001-201595 A | 7/2001 |
| WO | 96/37896 A | 11/1996 |

OTHER PUBLICATIONS

Machine Translation of FR2650113 (Blum et al.).*
Preliminary Examination Search Report, FA655505, 2 pgs., (Jan. 19, 2005).
International Search Report, PCT/FR2005/050552, 3 pgs., (Dec. 22, 2005).
"Improving Spent Fuel Racks With an Aluminium-Based Neutron Absorber", Wilmington Publishing Ltd, GB, vol. 34, No. 422, (Sep. 1, 1989), pp. 34-35, XP000074685, ISSN: 0029-5507.
Patent Abstracts of Japan; vol. 2000, No. 24, (May 11, 2001) & JP 2001 201595 A (Mitsubishi Heavy Ind Ltd), (Jul. 27, 2001).

* cited by examiner

STORAGE DEVICE FOR STORING AND TRANSPORTING NUCLEAR FUEL ASSEMBLIES

CROSS REFERENCE TO RELATED APPLICATIONS OR PRIORITY CLAIM

This application is a national phase of International Application No. PCT/FR2005/050552 entitled "Storage Device For Storing And Transporsing Nuclear Fuel Assemblies", which was filed on Jul. 7, 2005, which was not published in English, and which claims priority of the French Patent Application No. 04 07625 filed Jul. 8, 2004.

TECHNICAL FIELD

This invention relates in a general way to a storage device for storing and transporting nuclear fuel assemblies. More particularly, but not exclusively, the invention is applicable to the transport and/or storage of spent nuclear fuel assemblies.

PRIOR ART

Conventionally, such devices, also called a storage "basket" or "rack", are cylindrical in shape with a substantially circular cross section and have a plurality of adjacent compartments each capable of receiving a nuclear fuel assembly.

This type of device is designed to be capable of simultaneously performing three essential functions, which will be briefly stated below.

As a matter of fact, it is first a matter of the heat transfer function involving the heat released by the spent fuel assemblies. Aluminium or one of its alloys is typically used, due to its good thermal conduction properties.

The second function relates to neutron absorption, and the concern for maintaining the sub-criticality of the storage device when it is loaded with nuclear fuel assemblies. This is accomplished by using neutron-absorbing materials also know as neutrophage materials, such as boron. In addition, sub-criticality can also be ensured by providing spaces capable of being filled with water, e.g., in the interior itself of the partitions forming the compartments of the storage device.

Finally, the third essential function relates to the rigidity or mechanical strength of the device, which is primarily ensured by the presence of structural elements customarily made of steel. In this regard, it is noted that the overall mechanical strength of the device must be compatible with the regulatory safety requirements for the transport/storage of nuclear materials, in particular as concerns the so-called "free drop" tests.

In the prior art, several embodiments are known, which consist of stacking and crisscrossing notched structural elements, for the purpose of obtaining the adjacent compartments of the storage device.

However, though this type of embodiment is actually capable of performing the three above-mentioned functions, it is pointed out that such devices with stacked and crisscrossed structural elements are often produced according to a complicated design. This unavoidably entails disadvantages in terms of costs, both from the viewpoint of manufacturing the component parts as well as from the viewpoint of their assembly time.

OBJECT OF THE INVENTION

Thus, the purpose of the invention is to propose a storage device for storing and transporting nuclear fuel assemblies, this device having a simplified design in comparison with those previously encountered, while at the same time offering performance levels and capabilities at least equivalent to those related to the embodiments of the prior art.

To accomplish this, the object of the invention is a storage device for storing and transporting nuclear fuel assemblies, the device comprising a plurality of adjacent compartments, each having a lateral wall and being capable of receiving a nuclear fuel assembly, the lateral walls being made using notched structural units that are stacked and crisscrossed. According to the invention, each unit comprises two spaced-apart flats made of a neutrophage material, such as an alloy containing boron, as well as an intermediate structure situated between the flats and in contact with them.

Advantageously, the proposed storage device has an uncomplicated design based on the use of inexpensive elements that have a simple geometry and that are capable of being assembled together easily. Consequently, the overall cost of the device can be reduced in comparison with those encountered previously.

On the other hand, it is noted that the device according to the invention has a design such that it can easily perform all of the three essential functions stated above, by selecting materials suited to each of the component parts of the device. Furthermore, it is also able to satisfy all of the regulatory safety requirements for the transport/storage of nuclear materials.

As a matter of fact, in the preferred case where the flats of each of the structural units of the device are made from an alloy containing boron, and preferably from an alloy of aluminium and boron, the transfer of heat is then primarily ensured by said aluminium, while, as concerns neutron absorption, it is carried out with the help of the boron also provided for in the flats. In this regard, it is noted that the spacing of the two flats of each of the structural units makes it possible to define spaces capable of being occupied by water, always for the purpose of maintaining the sub-criticality of the storage device.

Finally, the overall mechanical strength can be substantially ensured by the intermediate structure of each of the structural units when this structure is at least partially made of steel, this intermediate structure simultaneously serving to space apart the two flats of the unit concerned. In this way, since the elements of the storage device ensuring the mechanical strength function can be disassociated from the elements ensuring the heat transfer and neutron absorption functions, implementation of safety analysis operations can be advantageously simplified.

It is clearly indicated that other choices of materials than those stated above might be adopted for the component parts of the structural units, without exceeding the scope of the invention. As an illustrative example, the intermediate structure and the flats might each be made of boron steel.

Each notched structural unit preferably has an overall H-shaped cross section, the two flats constituting the two sides of the H, respectively.

Furthermore, it is possible to provide for each compartment to have a lateral surface delimiting it, said lateral surface then consisting at least partially of the flats of the notched structural units forming the lateral wall of said compartment.

According to a first preferred embodiment of this invention, the intermediate structure of each structural unit is made so as to form a single part, preferably made entirely of steel. This single part, for example, can assume the shape of a part made in one piece, possibly later machined for the purpose of reducing its size.

It is therefore equally possible to provide for the intermediate structure of each structural unit to be rigidly assembled onto the two flats, or else for said intermediate structure to be "free" in relation to the two flats of this unit. In the latter case, the intermediate structure of a given structural unit is held in one stacking direction with the help of the structural units arranged in a crossed fashion in relation to the given unit, and is directly adjacent to it in the direction of stacking. More precisely, the intermediate structure of a given unit thus does not need to be mechanically joined to the flats thereof in order to be held in the piling direction, since it is held by the cooperation between the notches of the given unit and the notches belonging to the units in contact with it and arranged in a crossed fashion. In this first preferred embodiment, it is to be understood that the "units in contact and arranged in a crossed fashion" correspond to the structural units positioned directly adjacent to the given unit and situated on either side of it in the direction of stacking.

According to a second preferred embodiment of this invention, the intermediate structure of each structural unit includes two steel bars spaced apart from one another by spacing means, the two bars preferably being arranged parallel to one another and to the flats, and perpendicular to the direction of stacking. Preferably, the spacing means are rigidly assembled to the two flats of the structural unit, and the two steel bars can then be "free" in relation to the two flats of this unit. In this regard, the two steel bars are situated on either side of the spacing means, respectively, in relation to the stacking direction of the structural units.

In such a case, it is possible to provide for each bar of a given structural unit to be held in the stacking direction with the help of the spacing means, on the one hand, and, on the other hand, with the help of the structural units, which are arranged in a crossed fashion in relation to the given structural unit, and which are directly adjacent to it in the direction of stacking.

Here again, it is to be understood that the two bars of a given structural unit do not need to be mechanically joined to the flats thereof in order to be held in the stacking direction, since they are each held in one direction by the spacing means, and in the other direction by the cooperation between the notches of the given unit, and notches belonging to the units in contact with it and arranged in a crossed fashion.

In this second preferred embodiment, it is to be understood that the "units in contact and arranged in a crossed fashion" correspond to the structural units arranged directly adjacent to the unit concerned, but only those situated on the side of the given bar, in the direction of stacking.

The spacing means of each structural unit preferably include a plurality of spacers, each of which are penetrated through by fastening means joining them rigidly to the two flats of the structural unit. For illustrative purposes, the aforesaid fastening means can be chosen from amongst rivets and screw/nut assemblies.

Finally, in a still preferential manner, for any given layer n of structural units, the structural units of the layers n+1 and n+3 are in contact in pairs with the edges of the flats situated between the cut-outs provided on these flats. In the same way, the structural units of the layers n and n+2 are likewise in contact in pairs with edges of the flats situated between the cut-outs provided on these same flats.

Other advantages and characteristics of the invention will become apparent in the non-limiting detailed description below.

BRIEF DESCRIPTION OF THE DRAWINGS

This description will be made with regard to the appended drawings in which.

DETAILED DESCRIPTION OF THE PREFERRED EMBODIMENTS

Figure 1:
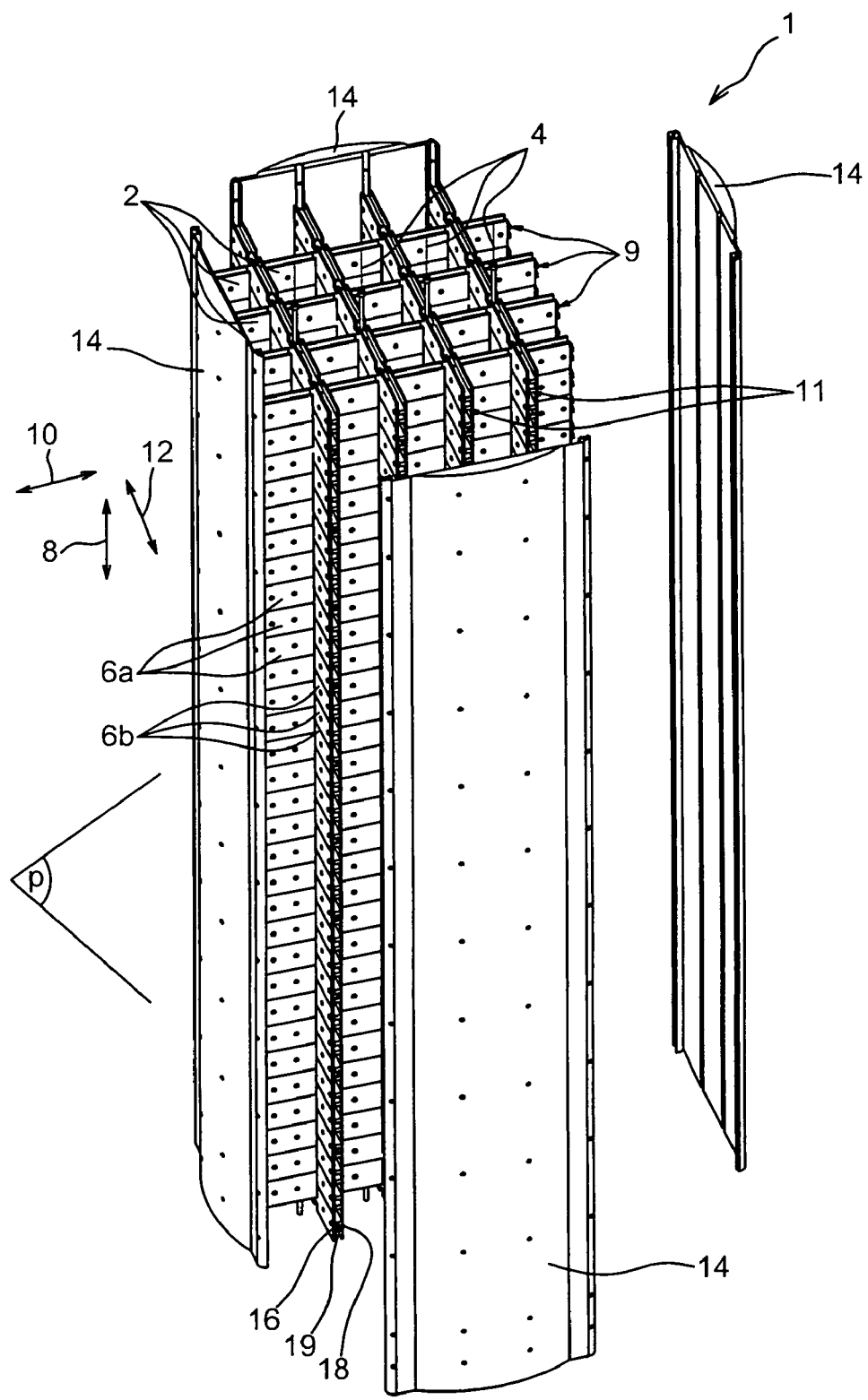
FIG. 1 shows a perspective view of a storage device for storing and transporting nuclear fuel assemblies, briefly illustrating the principle of this invention.

In reference to FIG. 1, a storage device 1 is shown, which is anticipated to be placed inside a packaging (not shown) intended for the transport/storage of nuclear fuel assemblies (not shown), preferably spent ones.

As can be seen in FIG. 1, the storage device 1 includes a plurality of adjacent compartments 2 arranged in parallel, the latter each run along a longitudinal axis 4. The compartments 2 are each capable of receiving at least one, and preferably a single fuel assembly having a square cross sectional shape.

The compartments 2 are thus provided so as to be juxtaposed to one another. They are produced by a plurality of notched structural units 6a, 6b, these units 6a, 6b being stacked in a stacking direction that is preferably parallel to the longitudinal axes 4 of the compartments 2, as shown schematically by the arrow 8 in FIG. 1. By agreement, it is acknowledged that, throughout the remainder of the description, the notion of "height" is to be associated with the direction of stacking 8.

As can be recognised in this same FIG. 1, the notched structural units 6a, 6b are crisscrossed, preferably in a perpendicular manner. In other words, the units 6a are situated parallel to one another, while the units 6b are also situated parallel to one another, but perpendicular to the units 6a.

When they are stacked in the stacking direction 8, the structural units 6a, 6b together form the lateral wall of each of the compartments 2, this lateral wall consequently having a substantially square cross sectional shape. Of course, the lateral wall of the compartments 2 could be in any other shape permitting a differently shaped fuel assembly to be held, such as a hexagonal shape.

Thus, in the example shown in FIG. 1, wherein the compartments 4 have a square cross section, the structural units 6a form vertical partitions 9 parallel to a direction 10, while the structural units 6b form vertical partitions 11 parallel to a direction 12, the directions 8, 10 and 12 being perpendicular to each other.

Each of the units 6a, 6b preferably runs between two peripheral partitions 14 with which it is made integral, these peripheral partitions 14 making it possible to close the storage device 1 laterally. For illustrative purposes, and as shown, these peripheral partitions 14 can be provided so as to number four, to each run along the entire height of the device 1, and to constitute a peripheral portion of the lateral wall of the peripheral compartments 2 of this device 1.

Furthermore, as clearly evident from the preceding, it is noted that each of the vertical partitions 9, 11 participates in the formation of a portion of the lateral wall of several compartments 2 situated on either side of the vertical partition in question.

As will be explained in detail below, each of the notched structural units 6a, 6b is produced with the help of two parallel flats 16, 18, preferably made of an alloy of aluminium and boron. However, other neutrophage materials could be adopted, such as boron steel, or else any other material containing elements of the gadolinium, hafnium, cadmium, or indium type, etc.

Thus, still with reference to FIG. 1, it can be seen that each of the flats 16, 18 is parallel to the stacking direction 8 as well as to one of the directions 10, 12, and participates in the definition of a plurality of compartments 2.

On the other hand, each of the notched structural units 6a, 6b has an intermediate structure 19 at least partially made of steel, this intermediate structure being situated between the flats 16, 18 and in contact with them.

Figure 2A:
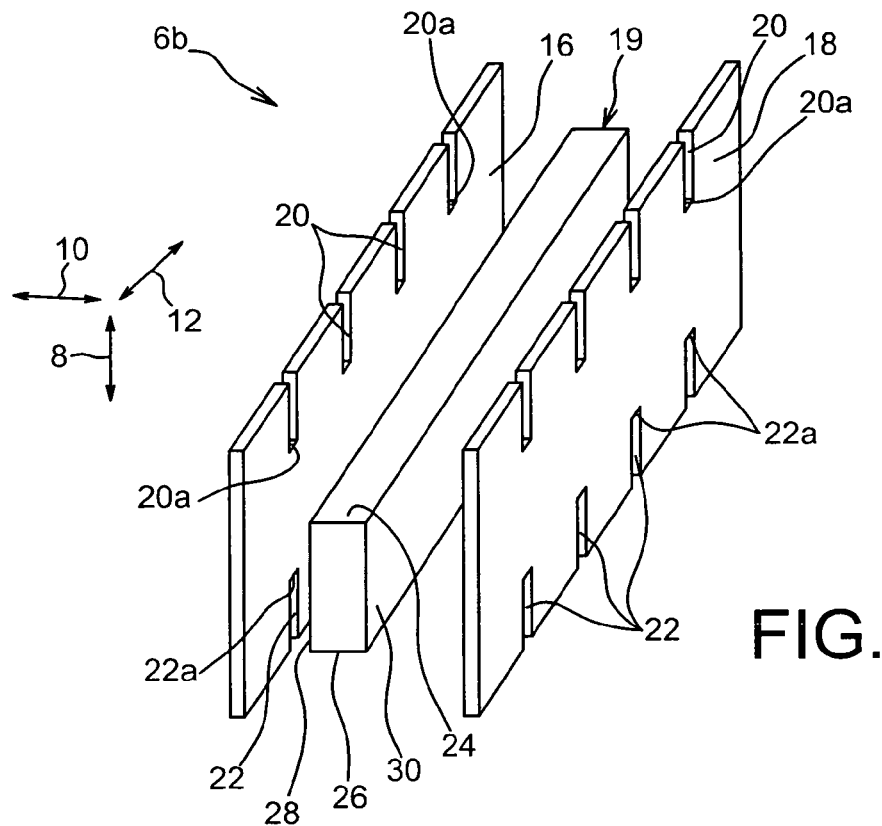
FIGS. 2a and 2b show perspective views of a notched structural unit used in a storage device for storing and transporting nuclear fuel assemblies, according to a first preferred embodiment of this invention, FIG. 2a being an exploded view of FIG. 2b.
Figure 2B:
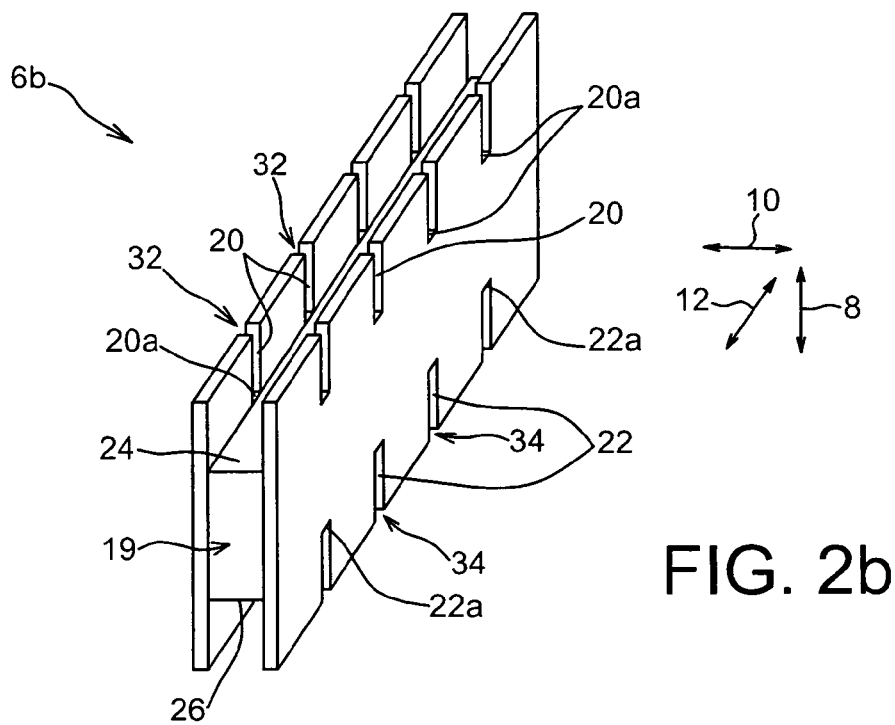
Figure 3:
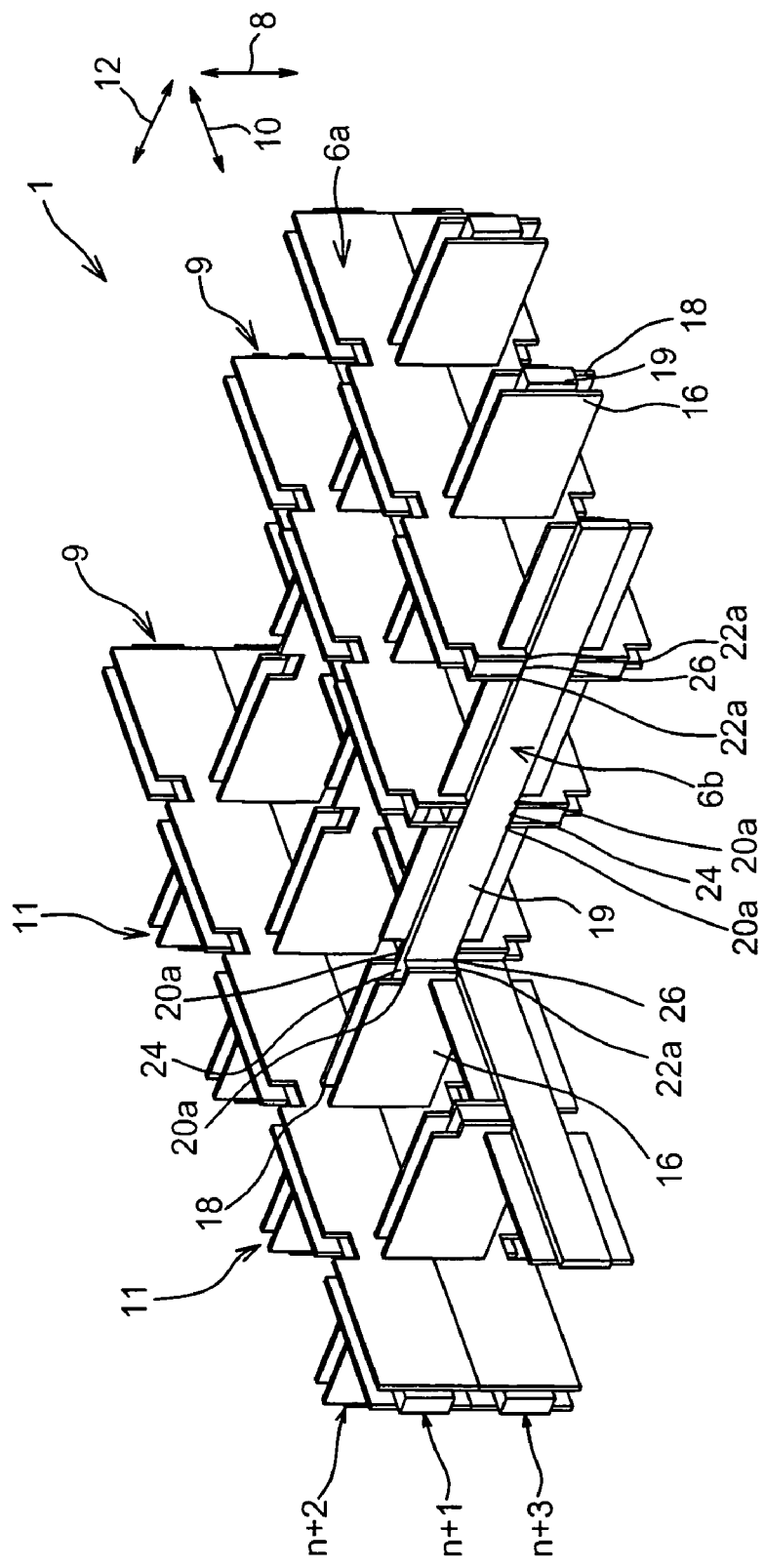
FIG. 3 is a partial perspective view of the storage device according to the first preferred embodiment, showing a plurality of notched structural units that have been stacked and crisscrossed, such as those shown in FIGS. 2a and 2b.

In reference now to FIG. 3, it is possible to recognise a portion of a storage device 1 according to a first preferred embodiment of this invention, this device 1 being produced with the help of a stack of notched structural units 6a, 6b such as the one shown in FIGS. 2a and 2b. In this regard, it is noted that the units 6a forming the partitions 9 are identical or similar to the units 6b forming the partitions 11, one of which will now be described in reference to FIGS. 2a and 2b.

In this first preferred embodiment of the invention, the notched structural unit 6b thus comprises two flats 16, 18 each having upper cut-outs 20 as well as lower cut-outs 22, these cut-outs 20, 22 opening out towards the top and towards the bottom, respectively, in the direction of stacking 8. In addition, each notch 20, 22 has a notch edge 20a, 22a corresponding to the bottom of this notch, and preferably assuming the shape of a flat surface situated parallel to the directions 10, 12, i.e., perpendicular to the stacking direction 8.

The unit 6b also comprises an intermediate structure 19, which, in this first preferred embodiment, is made so as to form a single part of steel, preferably stainless steel. This part can thus be made in one piece and then machined, or else be manufactured using elements that are welded together.

The intermediate structure 19 has an upper surface 24 as well as a lower surface 26 that are both situated parallel to the directions 10 and 12. Furthermore, it also comprises two lateral surfaces 28, 30 that are situated parallel to the directions 8 and 12, and intended to be in contact with the flats 16, 18, respectively, when the unit 6b is assembled on the stack. In this regard, it is clearly indicated that this intermediate structure 19 can be rigidly assembled to the flats 16, 18 by conventional fastening means (not shown), or else be free in relation to them, as will be explained later with reference to FIG. 3.

In reference to FIG. 2b, in which the intermediate structure 19 is shown in an "assembled" position in relation to the flats 16, 18, it is clearly indicated that, at the level of an upper portion of the unit 6b, the upper surface 24 of the intermediate structure 19 is situated in a plane at a level slightly lower than that of the plane in which the notch edges 20a are located, the two aforementioned planes being parallel to each other. In other words, in this assembled position, the notch edges 20a preferably protrude slightly upward in relation to the upper surface 24 of the intermediate structure 19.

In addition, a plurality of upper notches 32 of the unit 6b are each formed by two cut-outs 20 situated opposite one another and belonging to the flats 16 and 18, respectively. Thus, it is clear that the bottom of each upper notch 32 is a flat surface integrating the two notch edges 20a situated at a distance from each other. As mentioned above, the upper surface 24 of the intermediate structure 19 is preferably not involved in defining the bottoms of the upper notches 32.

Similarly, at the level of a lower portion of the unit 6b, the notch edges 22a form a single flat surface that is situated in a plane at a level slightly lower than that of the plane in which the lower surface 26 of the intermediate structure 19 is located, the two aforementioned planes also being parallel to one another.

Furthermore, a plurality of lower notches 34 of the unit 6b are each formed by two cut-outs 22 situated opposite one another and belonging to the flats 16 and 18, respectively. Here also, it is clear that the bottom of each lower notch 34 is a flat surface integrating the two notch edges 22a arranged at a distance from each other, but preferably not including the lower surface 26 of the intermediate structure 19.

In view of the preceding, it is therefore obvious that each unit 6a, 6b is preferably designed so that the distance between the lower 26 and upper 24 surfaces of the intermediate structure 19 is less than the distance separating any one notch edge 20a provided on any one of the two flats 16, 18 and the notch edge 22a situated on the same flat and in line with said notch edge 20a in the direction of stacking.

Naturally, these notches 32, 34 are intended to nest inside identical or similar notches belonging to the adjacent structural units 6a, for the obvious purpose of enabling the crisscrossed stacking of these units 6a, 6b.

Furthermore, it is clearly indicated that the unit 6b described in reference to FIGS. 2a and 2b has an overall H-shaped cross section, the intermediate structure 19 forming the core or "linking bar" of this H, and the two flats 16, 18 forming the two sides of this H, respectively.

This configuration, of course, is entirely suitable for the creation of spaces capable of being filled with water, for the purpose of ensuring that the sub-criticality of the device 1 is maintained. To this end, although it is not shown for this embodiment, but only in FIG. 6, for the second preferred embodiment that will be disclosed herein below, it is pointed out that the intermediate structures 19 preferentially have three passage holes that, during the drainage or filling operations of the storage device 1, enable the water to flow into the aforesaid spaces at the same rate as it flows into the compartments 2.

In reference again to FIG. 3, a portion of the storage device 1 according to the first preferred embodiment is seen, whose structural units 6a, 6b each have an intermediate structure 19 that is not mechanically joined to the associated flats 16, 18. As a matter of fact, the intermediate structure 19 of a unit 6a, 6b is only in lateral contact with the flats 16, 18 without being made integral with them.

In this FIG. 3, wherein a plurality of units 6a, 6b are stacked and crisscrossed, noted first is the presence of a layer n+1 of units 6a parallel to one another. In addition, a layer n+2 is situated directly beneath the layer n+1 in the direction of stacking 8, and consists of units 6b cooperating with the units 6a of the layer n+1, by means of the notches 32, 24. In this regard, the units 6b of the layer n+2 and the units 6a of the layer n+1 are thus arranged in a directly consecutive manner, in the direction of stacking 8, and are arranged in a crossed fashion in relation to each other.

Finally, a layer n+3 is situated directly beneath the layer n+2 in the direction of stacking 8, and consists of units 6a cooperating with the units 6b of the layer n+2, by means of the notches 32, 34. The units 6b of the layer n+2 and the units 6a of the layer n+3 are consequently arranged in a directly consecutive manner in the direction of stacking 8, and are arranged in a crossed fashion in relation to each other. On the other hand, as can be seen in FIG. 3, the structural units 6a of the layers n+1 and n+3 are also in contact in pairs with the edges of the flats 16, 18 (not shown) situated between the notches 32, 34.

In a more general way, it is clearly indicated that the structural units belonging to layers n+x and n+x+2 are in contact in pairs with the flats, so that, with the help of these same flats, lateral walls of completely continuous compartments are formed in the direction of stacking 8. Therefore, it is the contact between the edges of the flats 16, 18 situated between the cut-outs 20, 22 that is preferred during assembly of the structural elements 6a, 6b, and not the contact of the notch edges 20a, 22b cooperating in pairs.

In order to illustrate the manner in which the intermediate structures 19 are held in the stacking direction 8, any unit 6b of the layer n+2 of FIG. 3 is considered. The intermediate structure 19 of this unit 6b is capable of being held near the top, in the direction of stacking 8, with the help of the units 6a of the layer n+1 immediately following, via the cooperation of the upper notches 32 of the unit 6b concerned, with one of the lower notches 34 of each of the units 6a of the layer n+1, respectively (the reference numerals 32 and 34 not being indicated in FIG. 3).

More precisely, in order to guarantee the above-indicated contact between the edges of the flats of two structural units belonging to layers n+x and n+x+2, respectively, when the notches 32, 34 are nested in pairs as shown, a working clearance is created between the bottom of each of the upper notches 32 concerned and the bottom of its associated lower notch 34. For this reason, when the device is positioned vertically, as shown in FIG. 1, a clearance therefore also exists between the upper surface 24 of the intermediate structure 19 and the notch edges 22a of the lower notches 34 concerned.

Similarly, the intermediate structure 19 of this unit 6b is held near the bottom, in the direction of stacking 8, with the help of the units 6a of the layer n+3 immediately following, via the cooperation of the lower notches 34 of the unit 6b in question, with one of the upper notches 32 of each of the units 6a of the layer n+3, respectively.

Here again, when the notches 32, 34 are nested in pairs as shown, a working clearance is created between the bottom of each of the lower notches concerned 34, and the bottom of its associated upper notch 32. In addition, it is noted that, due to gravity, the lower surface 26 of the structure 19 is in flat contact with the two opposing notch edges 20a forming the associated upper notch 32.

Thus, although the intermediate structures 19 of the various units 6a, 6b are not in contact with one another, it is easy to understand that it is not necessary to mechanically join the structure 19 to the flats 16, 18 in order to hold it in a heightwise direction, which produces a considerable advantage in terms of time and costs involved in assembling the storage device 1.

As was indicated previously, in the vertical position shown in FIG. 1, the upper surface 24 of the intermediate structure 19 is not in contact with the notch edges 22a of the lower notches 34 situated opposite and above this surface 24. Such being the case, it has also been clearly indicated that the intermediate structure 19 was capable of being held in the direction of stacking 8 with the help of the units 6a of the layer n+1 immediately following. This is explained by the fact that the upper surface 24 of the intermediate structure 19 is capable of abutting against the notch edges 22a of the lower notches 34 provided on the units 6a of the layer n+1, when the device 1 is no longer arranged vertically but, for example, horizontally, as is encountered during the transport phases of this device.

Figure 5:
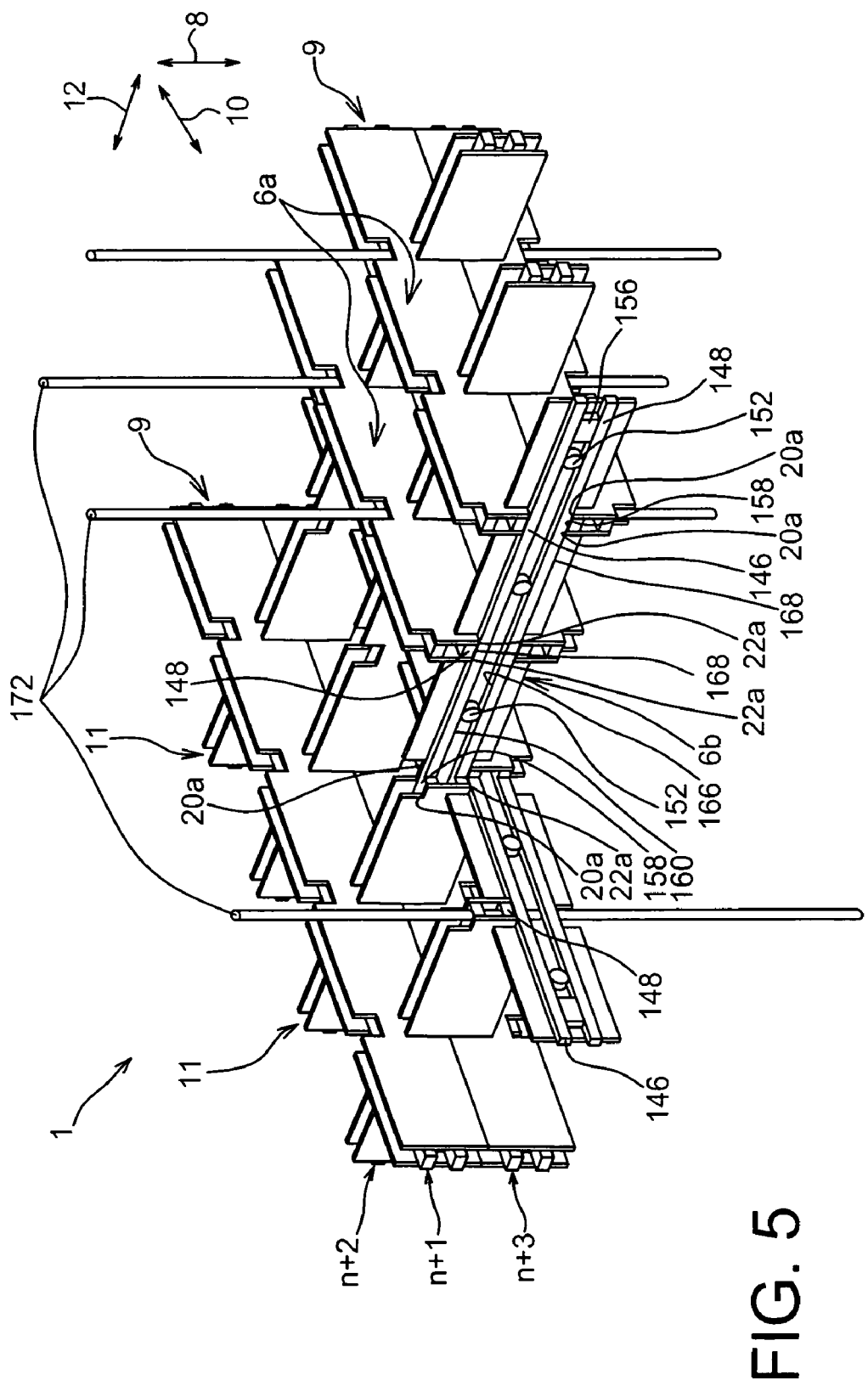
FIG. 5 is a partial perspective view of the storage device according to the second preferred embodiment, showing a plurality of notched structural units that have been stacked and crisscrossed, such as those shown in FIGS. 4a and 4b.

In reference now to FIG. 5, a portion of a storage device 1 according to a second preferred embodiment of this invention can be recognised, this device 1 being relatively similar to that of the first preferred embodiment. Consequently, in the figures, the elements bearing the same numeric references correspond to identical or similar elements.

Figure 4A:
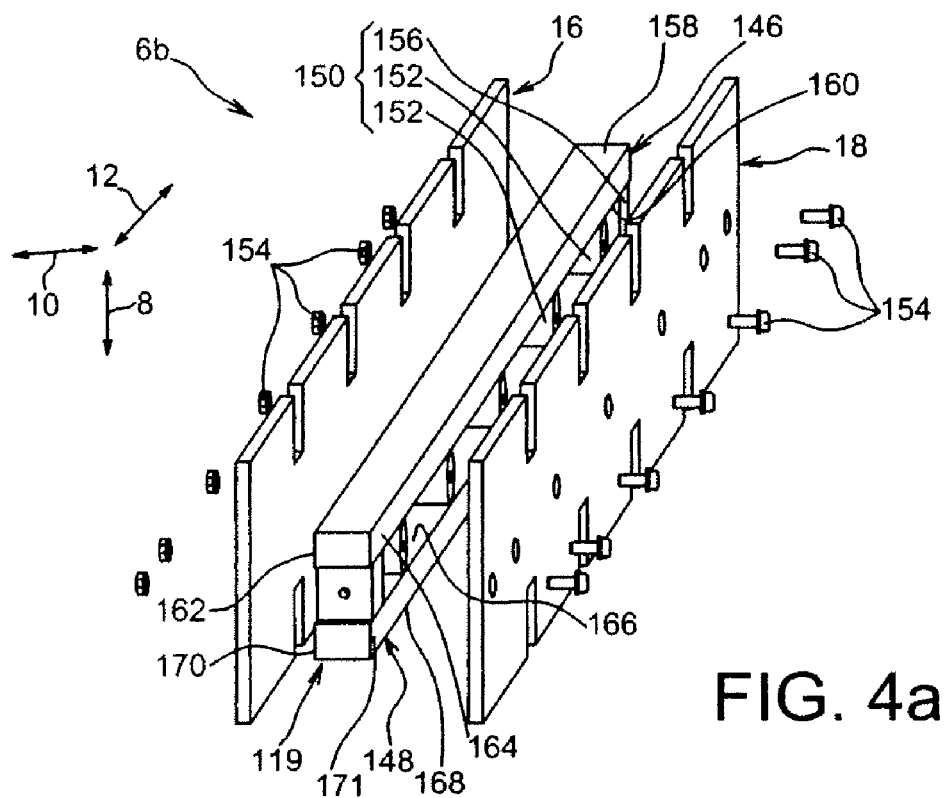
FIGS. 4a and 4b show perspective views of a notched structural unit used in a storage device for storing and transporting nuclear fuel assemblies, according to a second preferred embodiment of this invention, FIG. 4a being an exploded view of FIG. 4b.
Figure 4B:
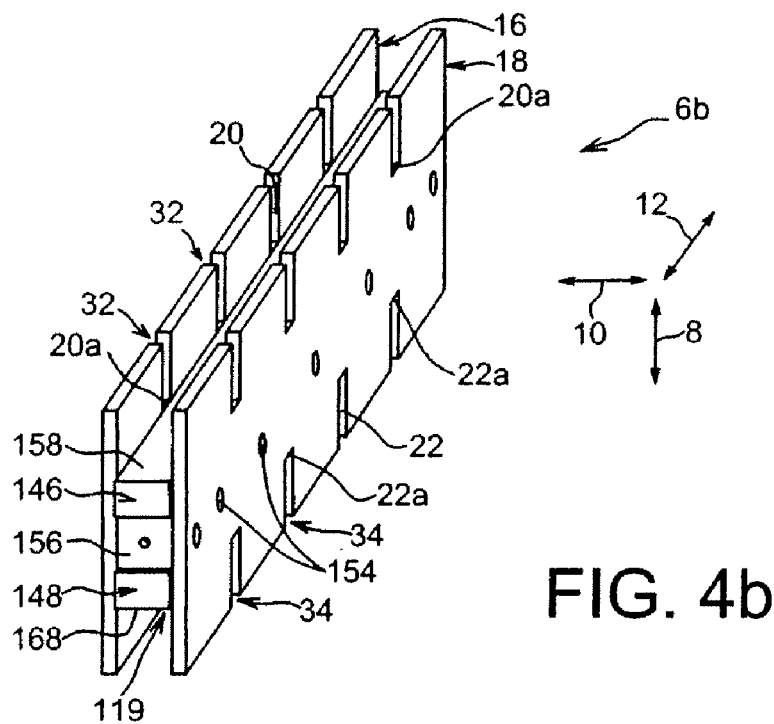

The device 1 is thus produced with the help of a stack of notched structural elements 6a, 6b, such as the one shown in FIGS. 4a and 4b. Here also, it is noted that the units 6a forming the partitions 9 are identical or similar to the units 6b forming the partitions 11, one of which will now be described in reference to FIGS. 4a and 4b.

In this second preferred embodiment of the invention, the notched structural element 6b thus comprises two flats 16, 18 identical or similar to those described previously, insofar as they have upper 20 and lower 22 cut-outs each having a notch edge 20a, 22a.

The unit 6b also comprises an intermediate structure 119, which differs from the structure 19 of the first preferred embodiment by the fact that it includes, in particular, two steel bars 146, 148, which are independent from one another, thus not forming a single part, and which are preferably made of stainless steel.

The intermediate structure 119 also consists of spacing means 150 provided between an upper bar 146 and a lower bar 148, these bars 146, 148 running from one end to the other of the unit 6b in question, preferably parallel to the direction 12 and perpendicular to the directions 8 and 10.

The spacing means 150, which are capable of being in contact with each of the bars 146, 148, include, for example, a plurality of steel spacers 152 arranged in a spaced apart manner in the direction 12, along the entire length of these bars 146, 148. Each of these spacers 152 is in contact with the two flats 16, 18 with which it is made integral at its two ends, with the help of fastening means 154 of the screw/nut- or rivet-type. In order to permit such an assembly, the flats 16, 18 are therefore drilled through, and each spacer 152 has an opening (not referenced) which runs in the direction 10 and through which the fastening means 154 are passed. For illustrative purposes, at the level of each of the two ends of the bars 146, 148, the spacing means 150 may have a parallelepiped or cube-shaped element 156, also made integral with the two flats 16, 18 with the help of screw/nut- or rivet-type fastening means 154. Naturally, in order to prevent damaging the nuclear fuel assemblies resting inside the compartments 2, the fastening means 154 are assembled on the flats 16, 18 so as to not protrude therefrom, and thus so as to not penetrate into these compartments 2.

Whatever design is adopted for the spacing means 150, it is noted that the upper bar 146 has an upper surface 158 as well as a lower surface 160, which are both situated parallel to the directions 10 and 12. Furthermore, it also comprises two lateral surfaces 162, 164 situated parallel to the directions 8 and 12, and intended to be opposite the flats 16, 18, respectively, when the unit 6b is assembled on the stack.

In the same way, the lower bar 148 has an upper surface 166 as well as a lower surface 168, which are both situated parallel to the directions 10 and 12. It also comprises two lateral surfaces 170, 171 situated parallel to the directions 8 and 12, and intended to be opposite the flats 16, 18, respectively, when the unit 6b is assembled on the stack.

Furthermore, as is clearly visible in FIG. 4a, the lower surface 160 of the upper bar 146 and the upper surface 166 of the lower bar 148 are both free to come into contact with the spacers 152 and the cube-shaped elements 156 of the spacing means 150.

In reference to FIG. 4b, in which the intermediate structure 119 is shown in an "assembled" position in relation to the flats 16, 18, it is clearly indicated that, at the level of an upper portion of the unit 6b, the upper surface 158 of the upper bar 146 is situated in a plane at a level slightly lower that that of the plane in which the notch edges 20a are located, the two aforementioned planes being parallel to each other. In other words, in this assembled position, the notch edges 20a protrude upward in relation to the upper surface 158 of the upper bar 146.

In addition, a plurality of upper notches 32 of the unit 6b are each formed by two cut-outs 20 situated opposite each other and belonging to the flats 16 and 18, respectively. Thus, it is clear that the bottom of each upper notch 32 is a flat surface integrating the two notch edges 20a situated at a distance from one another. As stated above, the upper surface 158 of the upper bar 146 is preferably not involved in defining the bottoms of the upper notches 32.

Similarly, at the level of a lower portion of the unit 6b, the notch edges 22a form a single flat surface that is situated in a plane at a level slightly lower than that of the plane in which the lower surface 168 of the lower bar 148 is located, the two aforesaid planes also being parallel to each other.

Furthermore, a plurality of lower notches 34 of the unit 6b are each formed by two cut-outs 22 situated opposite one another and belonging to the flats 16 and 18, respectively. Here also, it is thus clear that the bottom of each lower notch 34 is a flat surface integrating the two notch edges 22a arranged at a distance from each other, but preferably not including the lower surface 168.

In view of the preceding, it is thus obvious that each unit 6a, 6b is preferably designed so that the distance between the lower 168 and upper 158 surfaces of the intermediate structure 119 is less than the distance separating any one notch edge 20a provided on any one of the two flats 16, 18, and the notch edge 22a situated on the same flat and in line with said notch edge 20a, in the direction of stacking 8.

As was indicated previously, these notches 32, 34 are intended to cooperate with identical or similar notches belonging to adjacent structural units 6a, for the obvious purpose of enabling crisscrossed stacking of these units 6a, 6b.

The unit 6b described with reference to FIGS. 4a and 4b has an overall H-shaped cross section, the intermediate structure 119 forming the core or "linking bar" of this H, and the two flats 16, 18 forming the two sides of this H, respectively. For illustrative purposes, it is possible to provide a small clearance between each of the bars 146, 148 and the flats 16, 18 of the unit 6b.

In reference again to FIG. 5, a portion of the storage device 1 according to the second preferred embodiment is seen, wherein the structural units 6a, 6b each have an intermediate structure 119 the two bars 146, 148 of which are not mechanically joined to the associated flats 16, 18.

In this FIG. 5, which is similar to FIG. 3 wherein a plurality of units 6a, 6b are stacked and crisscrossed, noted first is the presence of a layer n+1 of units 6a that are parallel to each other. In addition, a layer n+2 is situated directly beneath the layer n+1, in the direction of stacking 8, and consists of units 6b cooperating with the units 6a of the layer n+1, by means of the notches 32, 34. The units 6b of the layer n+2 and the units 6a of the layer n+1 are thus arranged in a directly consecutive manner, in the direction of stacking 8, and are arranged in a crossed fashion in relation to each other.

Here again, a layer n+3 is situated directly beneath layer n+2, in the direction of stacking 8, and, consists of units 6a cooperating with the units 6b of the layer n+2 by means of the notches 32, 34. The units 6b of the layer n+2 and the units 6a of the layer n+3 are therefore arranged in a directly consecutive manner, in the direction of stacking 8 and are arranged in a crossed fashion in relation to each other.

In a more general way, it is clearly indicated that the structural units belonging to layers n+x and n+x+2 are in contact in pairs with the flats, so that, with the help of these same flats, lateral walls of completely continuous compartments are formed in the direction of stacking 8. As in the first preferred embodiment, therefore, it is the contact between the edges of the flats 16, 18 situated between the cut-outs 20, 22 that is preferred during assembly of the structural elements 6a, 6b, and not the contact of the notch edges 20a, 22b cooperating in pairs.

In order to illustrate the manner in which the intermediate structures 119 are held in the stacking direction 8, any unit 6b of the layer n+2 of FIG. 5 is considered.

The upper bar 146 of this unit 6b is capable of being held near the top, in the direction of stacking 8, with the help of the units 6a of the layer n+1 immediately following, via the cooperation of the upper notches 32 of the unit 6b concerned, with one of the lower notches 34 of each of the units 6a of the layer n+1, respectively (the reference numerals 32 and 34 not being indicated in FIG. 5).

More precisely, in order to guarantee the above-indicated contact between the edges of the flats of two structural units belonging to layers n+x and n+x+2, respectively, when the notches 32, 34 are nested in pairs as shown, a working clearance is created between the bottom of each of the upper notches 32 concerned and the bottom of its associated lower notch 34. For this reason, when the device is positioned vertically, as shown in FIG. 1, the notch edges 20a are not in contact with the associated notch edges 22a, and a clearance therefore also exists between the upper surface 158 of the upper bar 146, and the notch edges 22a of the lower notches 34 concerned.

Furthermore, the upper bar 146 of this unit 6b is simply held near the bottom, in the direction of stacking 8, by the contact between its lower surface 160 and the spacing means 150, this contact being obtained due to gravity.

Similarly, the lower bar 148 of this unit 6b is held near the bottom, in the direction of stacking 8, with the help of units 6a of the layer n+3 immediately following, via the cooperation of the lower notches 34 of the unit 6b in question with one of the upper notches 32 of each of the units 6a of the layer n+3, respectively.

Here again, when the notches 32, 34 are nested in pairs as shown, a working clearance is created between the bottom of each of the lower notches 34 concerned and the bottom of its associated upper notch. In addition, it is noted that, due to gravity, the lower surface 168 of the lower bar 148 is in flat contact with the two opposing notch edges 20a forming the associated upper notch 32.

The lower bar 148 of this unit 6b is simply held towards the top, in the direction of stacking 8, by the spacing means 150, although it is possible to note the presence of a clearance between the upper surface 166 and these spacing means 150.

Furthermore, it follows from the preceding that, at the level of each nesting of an upper notch 32 of a unit 6a, 6b with a lower notch 34 of a unit 6b, 6a immediately following, the upper 146 and lower 148 bars involved are perpendicular to each other, and tie rods preferably pass through them at their area of intersection, as will be explained later.

In the second preferred embodiment, it can easily be understood that it is advantageously not necessary to mechanically join the bars 146, 148 to the flats 16, 18 in order to hold them according to height.

As was indicated previously, in the vertical position shown in FIG. 1, the upper surface 158 of the upper bar 146 is not in contact with the notch edges 22a of the lower notches 34 situated opposite and above this surface 24. Such being the case, it was also clearly indicated that the upper bar 146 was capable of being held in the direction of stacking 8 with the help of the units 6a of the layer n+1 immediately following. This is explained by the fact that the upper surface 146 is capable of abutting against the notch edges 22a of the lower notches 34 provided on the units 6a of the layer n+1, when the device 1 is no longer arranged vertically but, for example, horizontally, as is encountered during the transport phases of this device.

In the same way, under certain circumstances, the upper surface 166 of the lower bar 148 is capable of abutting against the spacers 152 and the cube-shaped elements 156 of the spacing means 150, then involving a loss of contact between the lower surface 168 of this bar 148, and the notch edges 20a of the upper notches 32 provided on the units 6a of the layer n+3.

Figure 6:
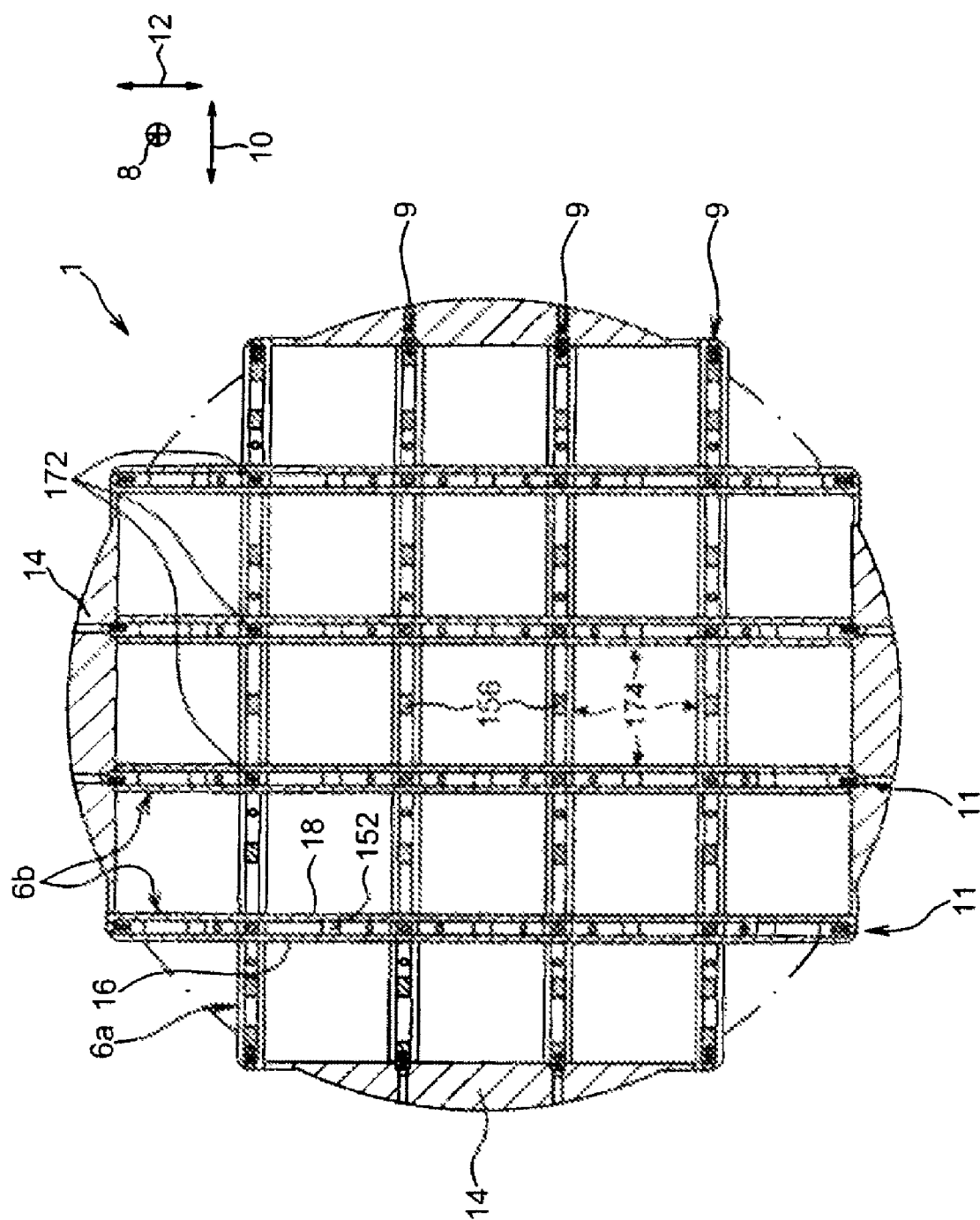
FIG. 6 shows a sectional view taken along plane P of FIG. 1, the plane P being perpendicular to the stacking direction of the notched structural units of the storage device.

With joint reference to FIGS. 5 and 6, it is seen that, at the level of each of the intersections or crisscrossings between the vertical partitions 9 parallel to the direction 10 and the vertical partitions 11 parallel to a direction 12, a tie rod 172 runs from one end to the other of the device 1, in the direction of stacking 8, and through the structural units 6a, 6b.

The tie rods 172, preferably made of stainless steel, thereby make it possible to ensure the mechanical strength of the areas of the storage device 1 where the notches 32, 34 are nested in pairs.

As is clearly visible in FIG. 5, each tie rod 172 passes through the intermediate structures 119 of the units 6a, 6b, and, more precisely, the two bars 146, 148 of each of these structures 119. In this way, for each cooperation between a lower notch 34 of a first unit 6a, 6b and an upper notch 32 of a second, crisscrossed unit 6b, 6a immediately following in the direction of stacking 8, the lower bar 148 of the first unit 6a, 6b being in contact with the notch edges 20a, the load of the tie rods 172 are thus heavily reduced. As a result, this advantageously makes it possible to reduce the diameter of the tie rods 172 as well as their associated mass.

In reference more specifically to FIG. 6, it is possible to see that the compartments 2, whose lateral wall is formed by the vertical partitions 9, 11, 14, are each delimited by a lateral surface 174 having a square-shaped cross section. For all of the above-stated preferred embodiments, it is possible to provide for this lateral surface 174 to be at least partially formed by the flats 16, 18 of the structural units 6a, 6b forming the vertical partitions 9, 11, respectively.

As is clearly visible in FIG. 6, only the lateral surface 174 of the peripheral compartments 2 is not entirely formed by the flats 16, 18, since a portion of the lateral surface of each of these peripheral compartments 2 is in this case also formed with the help of a peripheral partition 14.

Of course, various modifications in the storage devices 1, which have just described for non-limiting illustrative purposes only, can be introduced by those skilled in the art.

The invention claimed is:

1. Storage device for storing and transporting nuclear fuel assemblies, said device comprising a plurality of adjacent compartments, each having a lateral wall and being capable of receiving a nuclear fuel assembly, said lateral walls being made using notched structural units that are stacked and crisscrossed, wherein each unit comprises:
    two spaced-apart flats made of a neutrophage material;
    an intermediate structure situated between the flats, said intermediate structure comprising:
        two bars arranged between said two flats without being mechanically jointed to said flats; and
        a plurality of spacers in contact with said two flats, arranged in a spaced apart manner along the length of said two bars, each spacer being rigidly jointed to the two flats at its two ends, respectively, said two bars orthogonal to the direction of stacking of the structural units,
    wherein said intermediate structure of each structural unit includes two steel bars spaced apart from each other by spacing means that includes the plurality of spacers and wherein each of the plurality of spacers are penetrated through by fasteners joining them rigidly to the two flats of the structural unit.

2. Storage device of claim 1, characterised in that each notched structural unit has an overall H-shaped cross section, the two flats constituting the two sides of this H, respectively.

3. Storage device as claimed in claim 1, characterised in that each compartment has a lateral surface delimiting it, said lateral surface consisting at least partially of the flats of the notched structural units forming the lateral wall of said compartment.

4. Storage device as claimed in claim 1, characterised in that said neutrophage material is an alloy containing boron, and in that said intermediate structure is at least partially made of steel.

5. Storage device as claimed in claim 1, characterised in that said intermediate structure of each structural unit is made so as to form a single part.

6. Storage device of claim 5, characterised in that said intermediate structure of each structural unit is rigidly assembled on the two flats.

7. Storage device of claim 5, characterised in that said intermediate structure of a given structural unit is held in a stacking direction with the help of the structural units arranged in a crossed fashion in relation to the given unit and being directly adjacent to the given unit in the direction of stacking.

8. Storage device of claim 1, characterised in that, for each structural unit, said spacing means are rigidly assembled to the two flats of said structural unit, and in that one of the two steel bars is situated on one side of the spacing means and the other one of the two steel bars is situated on the opposite side of said spacing means, in relation to a stacking direction of the structural units.

9. Storage device of claim 8, characterised in that each bar of a given structural unit is held in the stacking direction with the help of the spacing means, on the one hand, and, on the other hand, with the help of the structural units, which are arranged in a crossed fashion in relation to said given structural unit, and which are directly adjacent to it in the direction of stacking.

10. Storage device as claimed in claim 8, characterised in that bars of each structural unit are arranged perpendicular to the direction of stacking.

11. Storage device as claimed in claim 2, characterised in that each compartment has a lateral surface delimiting it, said lateral surface consisting at least partially of the flats of the notched structural units forming the lateral wall of said compartment.

12. Storage device as claimed in claim 7, characterised in that for any given layer of structural units, the structural units of the next following and third following layers are in contact in pairs with the edges of the flats situated between cut-outs provided on these flats, and the structural units of the given layer and the second following layer are likewise in contact in pairs with edges of the flats situated between the cut-outs provided on these same flats.

13. Storage device of claim 1, wherein said fasteners are screw/nut assemblies.

* * * * *